United States Patent [19]

Minakuchi et al.

[11] Patent Number: 5,745,891
[45] Date of Patent: Apr. 28, 1998

[54] APPARATUS FOR REARRANGING THE ROWS OF INFORMATION IN A DISPLAYED TABLE BY HIGHLIGHTING A DIFFERENT COLUMN ATTRIBUTE

[75] Inventors: Mitsuru Minakuchi, Soraku-gun; Koichi Kashiwagi, Tenri; Toshiyuki Masui, Meguro-ku, all of Japan

[73] Assignee: Sharp Kabushiki Kaisha, Osaka, Japan

[21] Appl. No.: 721,823

[22] Filed: Sep. 27, 1996

[30] Foreign Application Priority Data

Sep. 28, 1995 [JP] Japan ................................. 7-251383

[51] Int. Cl.$^6$ ........................................ G06F 17/30
[52] U.S. Cl. ................................. 707/3; 345/968
[58] Field of Search ............... 707/3, 4, 7, 100, 707/101; 345/968

[56] References Cited

U.S. PATENT DOCUMENTS

| | | | |
|---|---|---|---|
| 5,239,287 | 8/1993 | Siio et al. | 340/706 |
| 5,312,478 | 5/1994 | Reed et al. | 395/148 |
| 5,517,254 | 5/1996 | Monta et al. | 348/569 |
| 5,632,009 | 5/1997 | Rao et al. | 395/770 |

OTHER PUBLICATIONS

R. Rao et al., "The Table Lens: Merging Graphical and Symbolic Representations in an Interactive Focus + Context Visualization for Tabular Information," *Human Factors in Computing Sustems*, CHI 1994, pp. 318–322.

*Primary Examiner*—Thomas G. Black
*Assistant Examiner*—John C. Loomis
*Attorney, Agent, or Firm*—David G. Conlin; David D. Lowry

[57] ABSTRACT

The data search apparatus includes: a data storage section for holding and storing data about all of the plurality of data items in a state where each of the plurality of data items is represented as a row, on which a plurality of attribute values about the data item are arranged in line, and the rows corresponding to the plurality of data items are sorted in a predetermined order decided by a designated attribute; a display control section for selectively displaying a predetermined number of data items from the plurality of data items in the predetermined order decided by the designated attribute on the display screen of the display device such that the attribute values of each of the displayed data items are arranged in line and that a designated data item row and a designated attribute value column are displayed in a different state from the other data item rows and the other attribute value columns; a designation change section for changing the designated row and the designated attribute value column; and a data item sorting section for sorting all of the plurality of data items which are stored in the data storage section in a new order determined by the newly designated attribute when the attribute is changed.

2 Claims, 6 Drawing Sheets

| 21 | 22a | 22 | 23 |
|---|---|---|---|
| 燃える瞳を持ち続けて | ま | 松阪晶子 | 燃える瞳を持ち続けて |
| MY MISTY | ま | 松崎しげる | Every time 大人にな |
| MAUI | ま | 松田聖子 | 大きな柳子の下で雨宿りしたの |
| WE ARE LOVE | ま | 松田聖子 | みつめる瞳から愛がうまれて |
| ハートのイアリング | ま | 松田聖子 | Stay with me 雪が舞 |
| ボーイの季節 | ま | 松田聖子 | 革のカバンひとつだけなの |
| 大切なあなた | ま | 松田聖子 | めぐり逢えたね待っていた |
| 野ばらのエチュード | ま | 松田聖子 | トゥルリラートゥルルリラー |
| その.まま.ま | ま | 松任谷由実 | ひとりのベッドにすわって |
| やさしさに包まれたなら | ま | 松任谷由実 | 小さい頃は神さまがいて |
| リフレインが叫んでる | ま | 松任谷由実 | どうしてどうして僕たちは |
| 中央フリーウェイ | ま | 松任谷由実 | 中央フリーウェイ調布基地を |
| 維新のおんな | ま | 松原のぶえ | 明日もわからぬ契りとして |
| 夕霧岬 | ま | 松原のぶえ | 誰を愛してここまで来たと |
| 離愁…秋から冬へ | ま | 松村和子 | 右に若狭の海を見て |
| 帰ってこいよ | ま | 松山千春 | きっと帰ってくるんだと |
| 卒業 | ま | 松山千春 | こみあげる淋しさに |
| 長い夜 | ま | 松山千春 | 恋にゆれる心ひとつ |
| 夜明け | ま | 松山千春 | どれ程目をこらしたなら |
| 恋 | ま | 松山千春 | 愛することに疲れたみたい |

FIG.3

| 21 (曲名) | 22a | 22 (歌手) | 23 (歌詞) |
|---|---|---|---|
| 燃える瞳を持ち続けて | ま | 松阪昌子 | 燃える瞳を持ち続けて |
| MY MISTY | ま | 松崎しげる | Every time大人にな |
| MAUI | ま | 松田聖子 | 大きな椰子の下で雨宿りしたの |
| WE ARE LOVE | ま | 松田聖子 | みつめる瞳から愛がうまれて |
| ハートのイアリング | ま | 松田聖子 | Stay with me雨が雪 |
| ボーイの季節 | ま | 松田聖子 | 革のカバンひとつだけなの |
| 大切なあなた | ま | 松田聖子 | めぐり逢えたね待っていた |
| 野ばらのエチュード | ま | 松田聖子 | トゥルルートゥルルルー |
| そのまま | ま | 松任谷由実 | ひとりのベッドにすわって |
| やさしさに包まれたなら | ま | 松任谷由実 | 小さい頃は神さまがいて |
| リフレインが叫んでる | ま | 松任谷由実 | どうしてどうして僕たちは |
| 中央フリーウェイ | ま | 松原のぶえ | 中央フリーウェイ調布基地を |
| 維新のおんな | ま | 松原のぶえ | 明日もわからぬ契りとしって |
| 夕霧岬 | ま | 松村和子 | 誰を愛してここまで来たと |
| 離愁…秋から冬へ | ま | 松山千春 | 右に若狭の海を見て |
| 帰ってこいよ | ま | 松山千春 | きっと帰ってくるんだと |
| 卒業 | ま | 松山千春 | こみあげる淋しさに |
| 長い夜 | ま | 松山千春 | 恋にゆれる心ひとつ |
| 夜明け | ま | 松山千春 | どれ程目をこらしたなら |
| 恋 | ま | 松山千春 | 愛することに疲れたみたい |

| 21 | 22 | 23a | 23 |
|---|---|---|---|
| 逃亡者 | 庄野真代 | だ | 誰れかが二人をおいかけてくる |
| 遠い恋のリフレイン | T-BOLAN | だ | 誰かの胸にすがりたくて |
| やさしさにさようなら | オフコース | だ | 誰かほかのひとのために生きる |
| ファイターズ讃歌 | ささきいさお/こおろぎ | だ | 誰が鳴らすかあの夕焼の鐘は |
| 漁火恋唄 | 小柳ルミ子 | だ | 誰にも言わずに裏木戸をぬけて |
| Moonlight Kiss | 陣内大蔵 | だ | 誰にも内緒なのが君の最初の |
| 恋するために生まれてきたの | C.C.ガールズ | だ | 誰にも言わずまだ言わないで絶対 |
| リバーサイド・ホテル | 井上陽水 | だ | 誰も知らない夜明けが明けた時 |
| 大きな森の小さなお家 | 河合奈保子 | だ | 誰も見たことナーイナーイ |
| 夕霧岬 | 松原のぶえ | だ | 誰を愛してここまで来たと |
| やさしさに包まれたなら | 松任谷由実 | も | 小さい頃は神さまがいて |
| HOLD ON | 久松史奈 | も | 小さい頃欲しかったおもちゃも |
| 大切な君に～横原敬之メドレー～ | 横原敬之 | も | 小さなストーブじゃ窓も |
| 横原敬之メドレー～大切な君に～ | 横原敬之 | も | 小さなストーブじゃ窓も |
| 第三者 | 木内美歩 | も | 地下鉄の入り口に吸い込まれて |
| 大雪（だいせつ）よ | 新沼謙治 | も | ちっぽけな目分にため息こぼれ |
| キカイダー01 | 子門真人 | も | チャレンジ01! きこえてくる |
| 中央フリーウェイ | 松任谷由実 | も | 中央フリーウェイ調布基地を |
| ちょいとそこ行くネエチャン | 憂歌団 | も | ちょいとそこ行くネエチャン |
| ちょうちょう | 童謡 | も | ちょうちょうちょうちょう |

| 21 | 22 | 23 |
|---|---|---|
| THIS IS POWER O | 小比類巻かほる | This is power o |
| TIME GOES BY | 小比類巻かほる | いつからか深くなる想いに |
| FARAWAY | 米米CLUB | この受話器をおけばもう二度と |
| FUNK FUJIYAMA | 米米CLUB | ワタシはNIHONハジメテデス |
| Meke up | 米米CLUB | Everyday 思うままに暮ら |
| Peeping Tom | 米米クラブ | 一億人覗き廻わるよ Peepin |
| TIME STOP | 米米クラブ | 瞳はせつなくグラスの空を飛ぶ |
| ヴィーナス | 米米クラブ | やけにまぶしいようシルクのシャツ |

20a {

22a (separator)

20b {

| 21 | 22 | 23 |
|---|---|---|
| 漁火恋唄 | 小柳ルミ子 | 誰にも言わずに裏木戸をぬけて |
| 来夢来人 | 小柳ルミ子 | 来る夢来る人通り過ぎてお前が遠く |
| YOKO...さよならの向こう | CORVETTES | 夕闇の影絡取って一度に大人になって |
| もう二度と誰さない | CORVETTES | 恋をしてゆくそんなに冷たく |
| Baby Rose | 近藤真彦 | どうしててんなに冷たく |
| Made in Japan | 近藤真彦 | テキサスのドライブ・インで |
| ああ、グッと | 近藤真彦 | 風がバタバタ鳴っている |
| ケジメなさい | 近藤真彦 | ケジメナシメのないあなた |
| ヨイショッ！ | 近藤真彦 | やいやいやい元気がないぜ |
| 大将 | 近藤真彦 | いい夢見ているかい |
| 夢絆（きずな） | 近藤真彦 | コンクリートの港にひとり |
| 月光仮面は誰でしょう | 近藤よしこ/キング | どこの誰かは知らないけれど |

FIG.6

| | 1st column | 2nd column | 3rd column | 4th column | 5th column | 6th column |
|---|---|---|---|---|---|---|
| | ああいい女 | ああいいおんな | 傘の要らない辺 恋雨が | かさのいらない こいあめが | 細川たかし | ほそかわたかし |
| | ああ上野駅 | あああうえのえき | どこかに故郷の 香りを | どこかにこきょ うのかおりを | 井沢八郎 | いざわはちろう |
| | ああ、グッと | ああ、ぐっと | 風がバタバタ鳴 っている | かぜがばたばた なっている | 近藤真彦 | こんどうまさひこ |
| | 嗚呼人生ぶるーす | ああじんせいぶ るうす | いつからだろう けだるい朝を迎 えるのは | いつからだろう けだるい | 前田亘輝 | まえだのぶてる |
| | ⋮ | ⋮ | ⋮ | ⋮ | ⋮ | ⋮ |

20d (bracket under columns 1–4)

1a

APPARATUS FOR REARRANGING THE ROWS OF INFORMATION IN A DISPLAYED TABLE BY HIGHLIGHTING A DIFFERENT COLUMN ATTRIBUTE

BACKGROUND OF THE INVENTION

1. Field of the Invention:

The present invention relates to a data search apparatus. More specifically, the present invention relates to an information processing apparatus which has a wide range of applications, from a large-scale database usable for a library search system, to various kinds of personal terminal devices such as personal computers, and portable information devices for searching for desired data.

2. Description of the Related Art:

In recent years, as information and communication technologies have been remarkably developed, it has become more and more frequent that a user is required to search for his desired data item from a data item set (such as a list of names and library document data) consisting of a large number of data items, each of which has a plurality of attributes. For example, in the case where a user searches for his desired data item from a list of names, each of the data items included in the list of names has a plurality of attributes such as "name", "address", "telephone number", "birthplace" and the like. In order to successfully search for a particular data item, it is common that a user is required to correctly designate some of these attribute values (i.e., information about the attributes).

Therefore, in the case where a searcher cannot definitely recall the attribute values of his desired data item, he cannot search for the data item well through a conventional search system. For example, in the case where a user tries to search for a person, if the user cannot recall the necessary attribute values of the person and says "I can't remember his name but I wonder if his birth place is the same as that of Mr. A, a friend of mine", it is difficult for the user to search for the person in a conventional manner.

Thus, in a conventional search system, since searching for a desired data item from a data item set consisting of a plurality of data items, each having a plurality of attributes, requires a user to correctly designate the individual attribute values of the searched-for data item, it is difficult to find the desired searched-for data item based on indefinitely memorized information about the data item and by performing a simple operation.

SUMMARY OF THE INVENTION

The data search apparatus of the invention is provided with a body device for processing information; an input device for inputting the information to the body device; and a display device for displaying the processed information on a display screen, thereby searching for a desired data item from a data set including a plurality of data items. The data search apparatus includes: data storage means for holding and storing data about all of the plurality of data items in a state where each of the plurality of data items is represented as a row, on which a plurality of attribute values about the data item are arranged in line, and the rows corresponding to the plurality of data items are sorted in a predetermined order decided by a designated attribute; display control means for selectively displaying a predetermined number of data items from the plurality of data items in the predetermined order decided by the designated attribute on the display screen of the display device such that the attribute values of each of the displayed data items are arranged in line and that a designated data item row and a designated attribute value column are displayed in a different state from the other data item rows and the other attribute value columns; designation change means for changing the designated row and the designated attribute value column in accordance with an input from the input device for newly designating another row and another attribute value column to be displayed on the display screen; and data item sorting means for sorting all of the plurality of data items which are stored in the data storage means in a new order determined by the newly designated attribute when the attribute is changed, whereby the plurality of data items are sorted while maintaining a state where the designated data item row remains displayed on the display screen.

In one embodiment, the data item sorting means shifts an arrangement of all of the plurality of data items with respect to a reference location such that the designated data item is held at the same location on the display screen before and after the plurality of data items are sorted.

Hereinafter, the functions or the effects to be attained by the present invention will be described.

According to the present invention, a designation change section for changing a designated row and a designated attribute value column in accordance with an input from an input device for selecting a row and an attribute value column to be displayed on the display screen is provided so that all the data items composing a data set, from which a desired data item is searched for, are sorted in a new order determined by a newly selected attribute when the attribute is changed. Therefore, if the data items are rearranged by changing the designated attribute in searching for a desired data item, not only the data item currently "remarked" (or selected) by the user, but also other data items having an attribute value associated with the remarked data item can be displayed as a list on the display screen so that other data items associated with the currently remarked data item can be easily searched for.

Even when the desired data item is not found in the vicinity of the currently remarked data item among the rearranged data items displayed on the display screen, the data items can be further rearranged instantaneously based on a different attribute value according to how the information relating to the rearranged and displayed data items is mentally associated by the user.

By changing the arrangement of data items based on an attribute value of how the information relating to the sorted and displayed data items is mentally associated by the user depending upon the situation, the desired data item can be quickly found.

According to the present invention, the designated data item is held at the same location on the display screen before and after the plurality of data items are sorted. Consequently, a data item currently remarked and used for searching for a desired data item is not missed when the data items are rearranged, so that the user can perform a search operation more efficiently.

Thus, the invention described herein makes possible the advantage of providing a data search apparatus which can effectively utilize the association function of a person who searches for a data item and is reminded of various kinds of information associated with the attribute values of the searched-for data item, and which can quickly find the searched-for data item by a simple operation for tracing the various kinds of information reminded by this association function even when the information about the searched-for data item is indefinitely memorized by the person.

This and other advantages of the present invention will become apparent to those skilled in the art upon reading and understanding the following detailed description with reference to the accompanying figures.

BRIEF DESCRIPTION OF THE DRAWINGS

FIG. 1A and FIG. 1B illustrate the data search apparatus in an example of the present invention:

DESCRIPTION OF THE PREFERRED EMBODIMENTS

First, the fundamental principles of the present invention will be described.

According to the present invention, a plurality of data items included in a data set, from which a desired data item is searched for, are assumed to be sorted such that the attribute values of the respective data items are arranged in a predetermined order decided by the designated attribute, and a plurality of attribute values of each data item are assumed to be arranged in line to form a data item row. In the following description, a column consisting of the attribute values of the respective data items and corresponding to each attribute in the arrangement of the sorted data items will be called an "attribute column".

The data search apparatus according to the present invention includes: a body device for processing information; an input device (e.g., a keyboard) for inputting the information to the body device; and a display device for displaying the processed information on a display screen. In the data search apparatus, a part of the data item arrangement (more specifically, a part of the table in which the data items are arranged) is assumed to be displayed on the display screen. On the display screen, the data items are arranged in the vertical direction and the respective attribute columns are arranged in the horizontal direction. In addition, when a particular row (or data item) or a particular attribute column (or column consisting of attribute values) is "remarked" (or selected), the row or the column is prominently displayed with a different luminance or color tone so as to be easily distinguishable from the other rows or columns. In the data search apparatus, a row or a column to be remarked on the display screen can be changed by pushing the arrow keys or the like on the keyboard.

In the data search apparatus, when a command to change the remarked row is input, the prominently display portion only moves vertically on the display screen. On the other hand, when a command to change the remarked attribute is input, the respective rows (or data items) composing the data set are sorted based on an order prescribed for the attribute values of the newly remarked attribute. In this case, the display position of the remarked row is assumed to remain the same on the display screen before and after the data items are sorted.

In the above-described manner, a desired data item can be easily searched for by tracing the attribute values of the data items associated with the desired data item.

Figure 2:
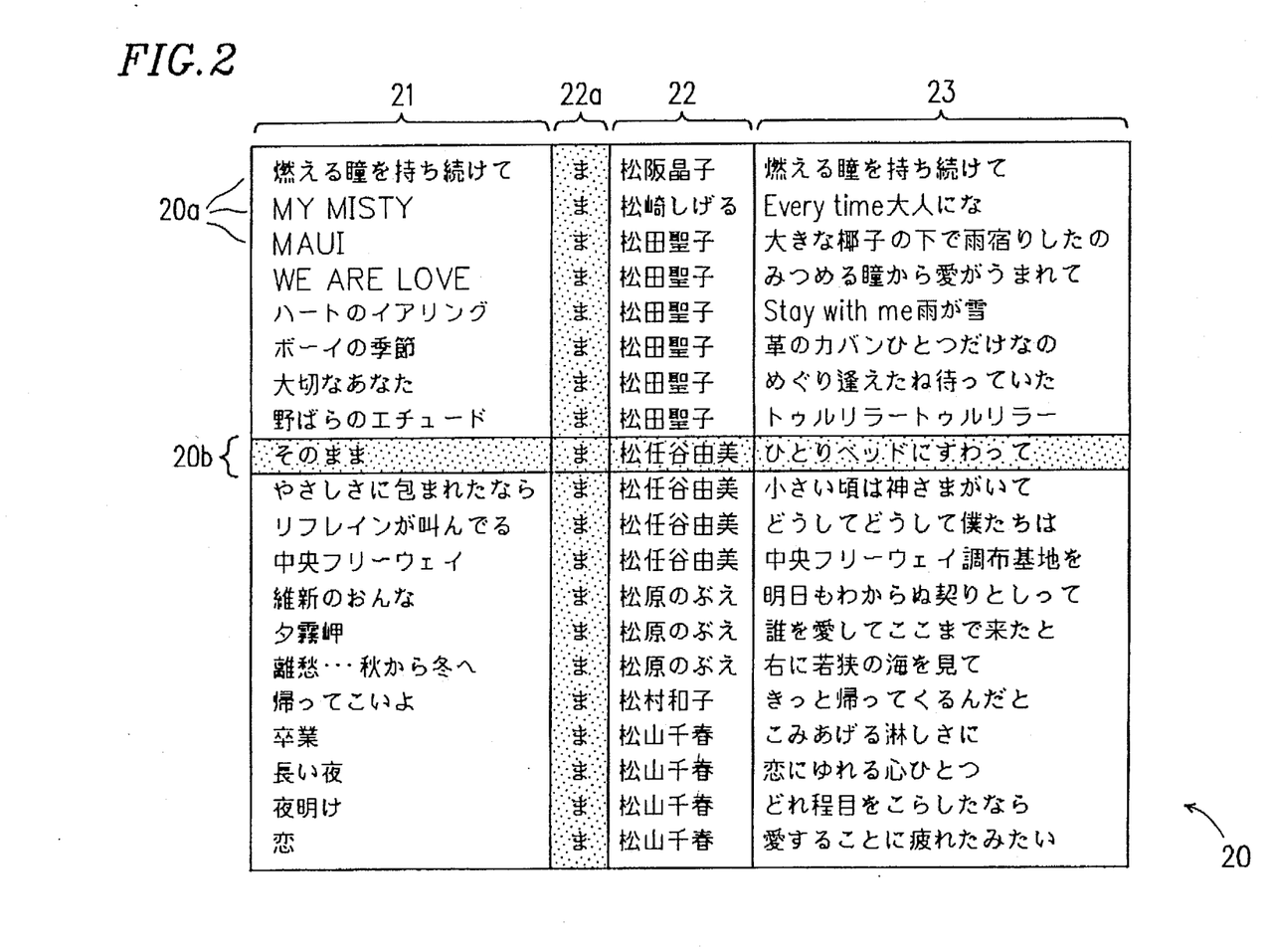
FIG. 2 is a table showing the initial display state of a data item display region displayed on the display screen of the data search apparatus.

For example, FIG. 2 shows a display state on the display screen in which a musical piece data item for a tune entitled "そのまま (Sonomama)" sung by a singer "松任谷 由美 (Matsutoya Yumi)" is remarked from a data set consisting of musical piece data items, each of which has three kinds of attributes of "name of tune" 21, "singer's name" 22 and "lyrics" 23, and in which the attribute "singer's name" 22 is remarked.

Figure 3:
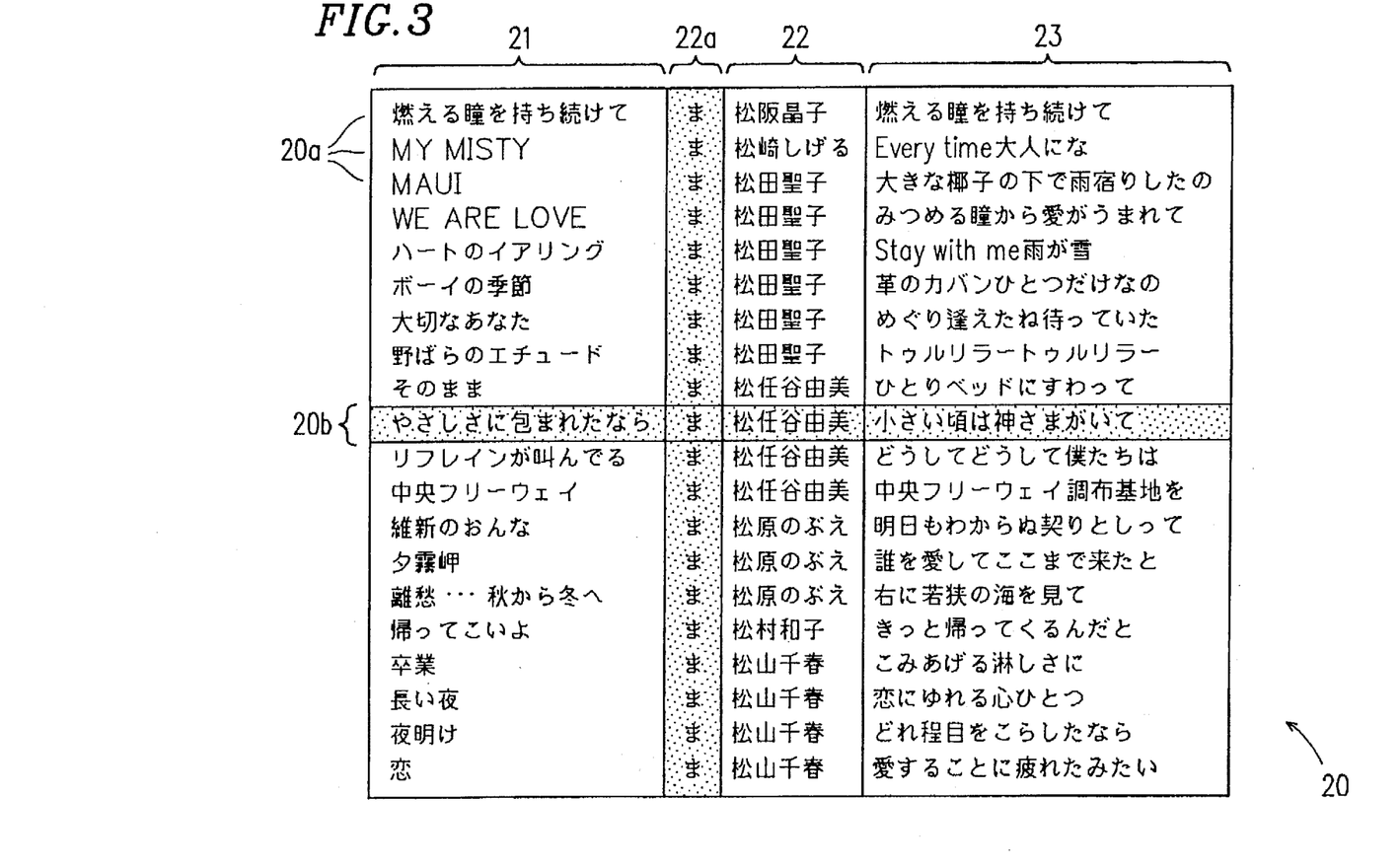
FIG. 3 is a table showing the display state of the data item display region displayed when an operation for selecting a data item row lower than the row selected in FIG. 2 by one row is performed.

In this case, if the musical piece data item to be remarked is changed into the musical piece data item on the row lower by one row than the currently remarked row, then the display state on the display screen is changed into the state shown in FIG. 3. That is to say, the contents of the musical piece data items displayed on the display screen have not been changed, but only the remarked row (i.e., the remarkably displayed portion 20b) has been changed.

Figure 4:
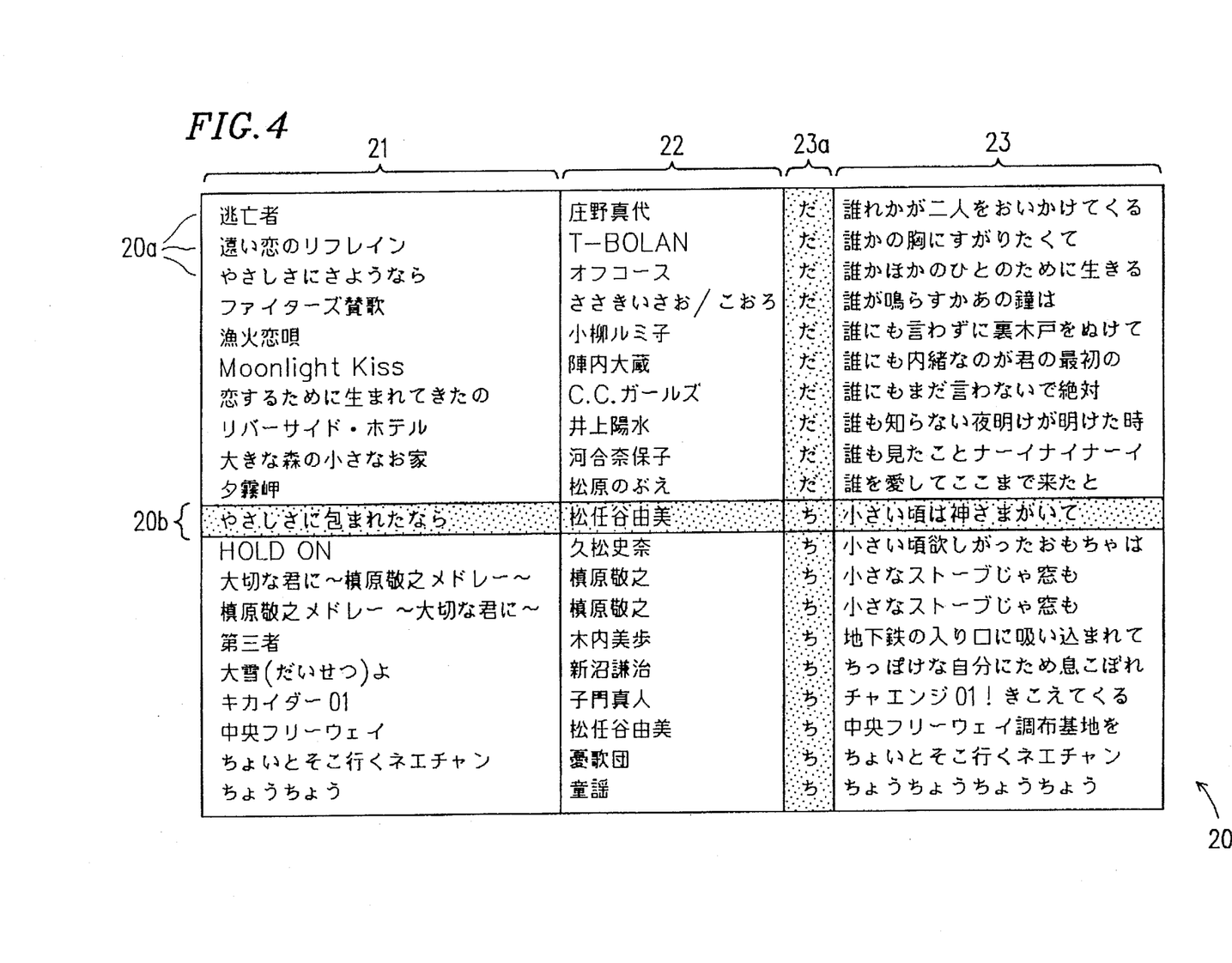
FIG. 4 is a table showing the display state of the data item display region displayed when an operation for changing the attribute remarked in FIG. 3 into another attribute is performed.

Moreover, if the remarked attribute is changed from "singer's name" 22 remarked in FIG. 3 into "lyrics" 23, the display state on the display screen is changed from that shown in FIG. 3 into that shown in FIG. 4. Though the display position of the remarked row (or the remarked musical piece data item) on the display screen and the remarkably displayed portion 20b on the row have not been changed, all the rows other than the remarked row have been changed on the display screen. In FIG. 4, the respective musical piece data items have been sorted in a predetermined order about the remarked attribute or "lyrics" 23.

When the musical piece data items are displayed by remarking the attribute 22 or "singer's name" as shown in FIG. 2, the musical piece data items corresponding to the tunes sung by the same singers or the singers whose family names begin with the same Chinese character having the same pronounced sound (i.e., "松 (Matsu)" in FIG. 2) are arranged. On the other hand, when the musical piece data items are displayed by remarking the attribute 23 or "lyrics" as shown in FIG. 4, the musical piece data items corresponding to the tunes having the lyrics which be gin with the same Chinese character having the same pronounced sound (e.g., "誰 (Dare)") or the same Japanese kana character having the same pronounced sound (e.g., "ち (Chi)") are arranged.

It is noted that the respective data items have been sorted in the order of "あいうえお" (i.e., in the order of the Japanese kana syllabary) with respect to a remarked attribute in FIGS. 2 and 4. For example, in FIG. 2, the remarked attribute is "singer's name". When a sorting is performed, the singers' name represented by Chinese characters are first converted into kana characters representing the sounds of the Chinese characters. An order called "あいうえお" corresponding to the English alphabetical order exists in the Japanese kana syllabary. Next, the singers' names represented by the kana characters are sorted in the order of "あいうえお". A case where the singers' names "Ko-ya-na-gi Ru-mi-ko" and "Ma-tsu-to-ya Yu-Mi" are sorted will be exemplified. Herein, the hyphens indicate the junctions between adjacent kana characters. That is to say, "ko","ya", "na","gi" and the like are represented by the respectively different kana characters. In the Japanese kana syllabary, "ko" is prior to "ma". Therefore, by sorting the singers' names in the order of "あいうえお", the singer's name "Koyanagi Rumiko" is located prior to the singer's name "Matsutoya Yumi" on the list.

Figure 5:
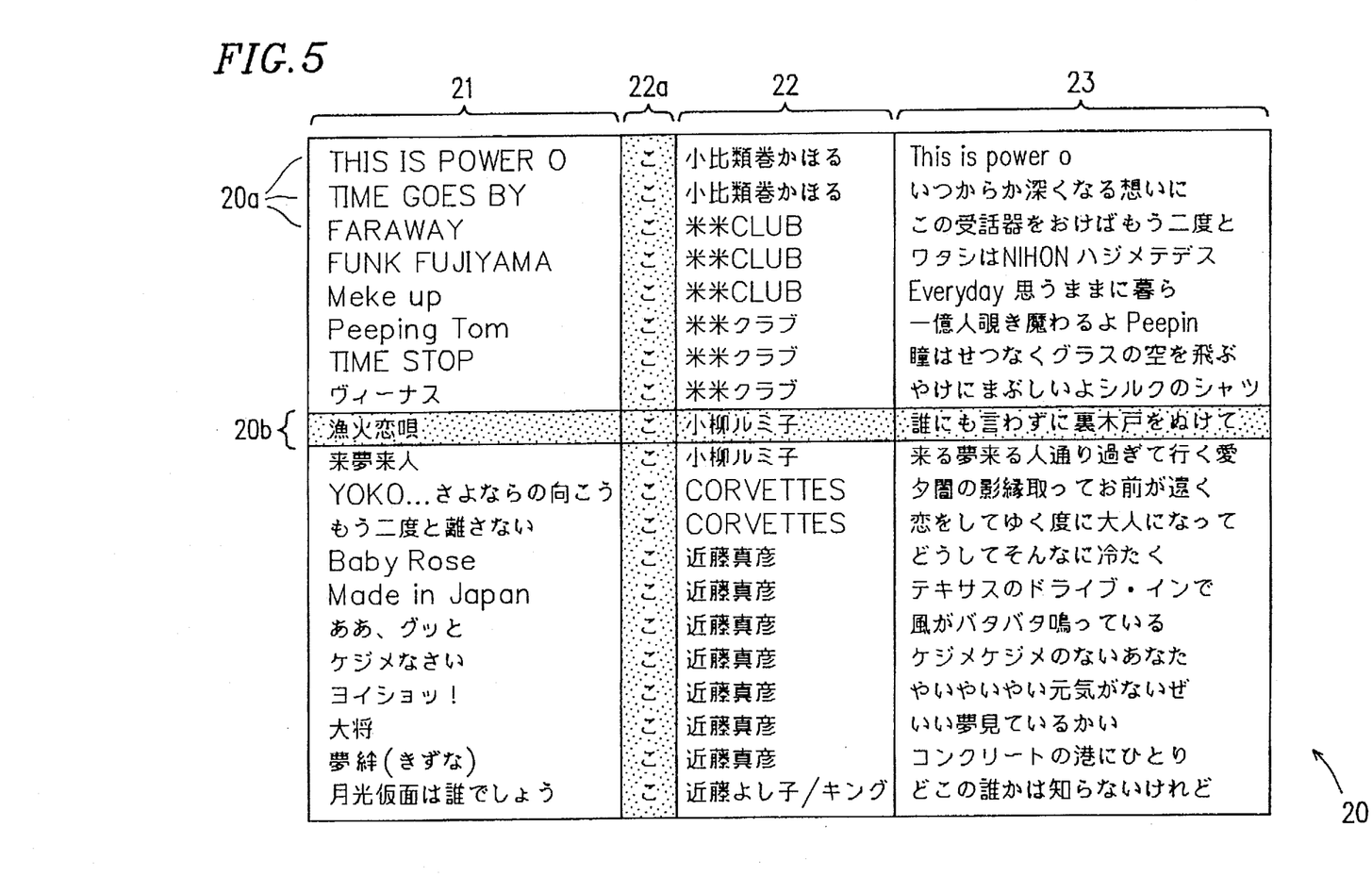
FIG. 5 is a table showing the display state of the data item display region displayed when an operation for selecting a data item row higher by six rows than the row selected in FIG. 4 and an operation for changing the attribute remarked in FIG. 4 into another attribute are sequentially performed.

In this case, when the user has interest in a tune entitled "漁火恋唄 (Isaribi-koiuta)" sung by "小柳ルミ子 (Koyanagi Rumiko)" and he wants to know other tunes sung by "小柳ルミ子", the user is required to shift a remarked row to the row 6 rows higher than the current row and to change the remarked attribute from "lyrics" 23 into "singer's name" 22 so that the display state of the musical piece data items on the display screen is changed into the state shown in FIG. 5 and all the musical piece data items about tunes sung by "小柳ルミ子" can be displayed.

As described above, in a system utilizing the data search method according to the present invention, while tracing the names of tunes or the names of singers which are associated with a particular tune, other tunes can be searched for by the association function.

In the data search apparatus having such a configuration, since a plurality of data items extracted from the data set can always be sorted as a list with respect to a remarked attribute, other data items associated with the remarked data item can be easily found and data items which seem to be associated with the desired data item can be easily estimated from the remarked data item.

In addition, in the case where the remarked attribute is changed into another attribute, the display position of the remarked data item is not changed but the data items which have been sequenced based on the newly selected attribute and are associated with the remarked data item are newly displayed around the remarked data item, so that data items which are associated with each other among different attributes can be easily searched for.

By combining the search functions of such a data search apparatus for tracing the data items associated with the remarked data item on the display screen, the desired data item can be easily searched for.

Hereinafter, the embodiments of the present invention will be described with reference to the accompanying drawings.

Figure 1A:
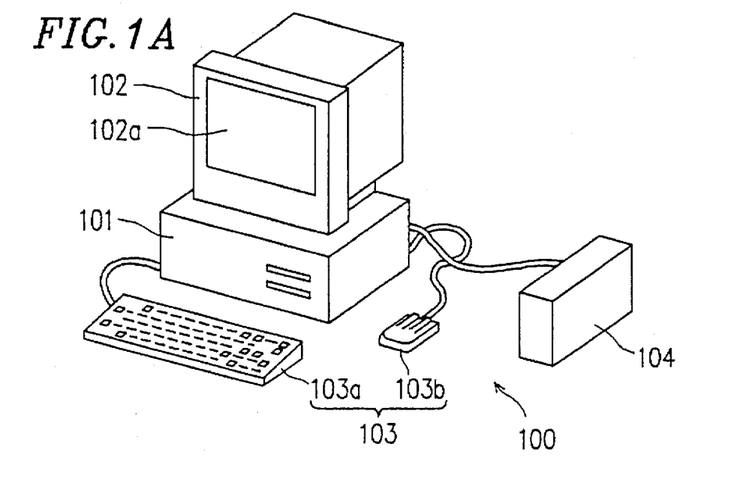
FIG. 1A is a perspective view showing the external hardware configuration of the information processing apparatus into which a data search function is incorporated so as to function as the data search apparatus.
Figure 1B:
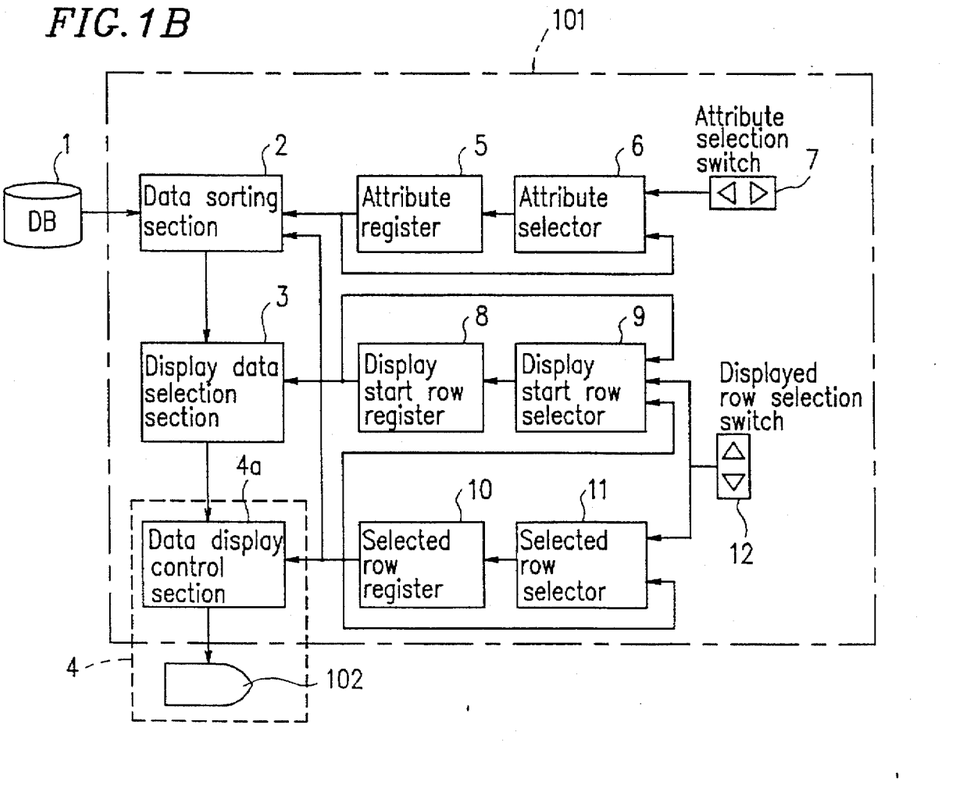
FIG. 1B is a block diagram showing a configuration for implementing the data search function of the information processing apparatus.

FIG. 1A and FIG. 1B illustrate the data search apparatus in an example of the present invention: FIG. 1A is a perspective view showing the external hardware configuration of the information processing apparatus into which a data search function is incorporated so as to function as the data search apparatus; and FIG. 1B is a block diagram showing a configuration for implementing the data search function of the information processing apparatus.

In FIGS. 1A and 1B, the information processing apparatus 100, into which the data search function according to the present invention is incorporated, includes: a body device 101 of the processing apparatus for performing various kinds of operation processing; a display device 102 having an image display screen 102a for displaying image information thereon; a keyboard 103a and a mouse 103b which function as input devices for inputting some information (e.g., a signal instructing search processing) to the body device 101; and a hard disk device 104 functioning as an information storage device.

The hard disk device 104 includes a database 1 in which all the data items composing the data set are stored such that desired data item can be searched for from the database 1. In this example, the data set from which desired data is searched for is a musical piece data set consisting of musical piece data items corresponding to 1000 musical pieces, for example.

As shown in FIG. 1B, the body device 101 includes: a data sorting section 2 for sorting a plurality of musical piece data items stored in the database 1 such that the attribute values of the respective data items are arranged in a predetermined order with respect to a designated attribute; a display data selection section 3 for selecting the data items to be displayed from the data set in which the data items have been sorted; and a data display control section 4a for displaying the data items selected by the display data selection section 3 on the display screen 102a of the display device 102. In this example, the display device 102 and the data display control section 4a constitute a data display device 4 for displaying a predetermined number of data items.

In this example, the data sorting section 2 is configured to shift the arrangement of all the data items with respect to a reference location (e.g., a location corresponding to the location at which the top data item on the display screen is displayed) such that the designated data item can be held at the same location on the display screen before and after the data items are sorted.

The body device 101 further includes: an attribute register 5 for outputting a signal designating an attribute used as a reference for sorting the data items to the data sorting section 2; a display start row register 8 for outputting a signal corresponding to the row number of the top data item displayed on the display screen 102a to the display data selection section 3; and a selected row register 10 for outputting a signal designating a remarkably displayed row to the data display control section 4a.

The body device 101 is further provided with an attribute selection switch 7 and a displayed row selection switch 12. The switch 7 is turned ON by manipulating the keys of the keyboard 103a, thereby outputting a signal for selecting an attribute. On the other hand, the switch 12 is also turned ON by manipulating the keys of the keyboard 103a, thereby outputting a signal for selecting a displayed row. Moreover, the attribute selection switch 7 and the displayed row selection switch 12 are turned ON not only by manipulating the keys of the keyboard 103a but also by manipulating the mouse 103b. In the case where the data search apparatus is a portable apparatus of a small size or the like, these switches 7 and 12 can be switches which are provided outside the apparatus and can be directly manipulated by an operator by pushing them or a like manipulation.

The body device 101 further includes: an attribute selector 6; a display start row selector 9; and a selected row selector 11 for operating the attribute register 5; the display start row register 8; and the selected row register 10, respectively. The attribute selector 6 is configured so as to supply a signal for selecting an attribute to the attribute register 5 in accordance with the signal supplied from the attribute selection switch 7 and the output of the attribute register 5. The display start row selector 9 is configured so as to supply a signal for designating a display start row to the display start row register 8 in accordance with the signal supplied from the displayed row selection switch 12, the output of the display start row register 8 and the output of the selected row register 10. Furthermore, the selected row selector 11 is configured so as to supply a signal for designating the selected row to the selected row register 10 in accordance with the output of the displayed row selection switch 12 and the output of the selected row register 10.

In the information processing apparatus 100 having such a configuration, in the case where the user performs a manipulation for changing the designated attribute used as a reference for sorting, the attribute selector 6 calculates a value corresponding to the newly selected attribute based on the output of the attribute selection switch 7 and a value currently stored in the attribute register 5, and then stores the calculated value in the attribute register 5. The data sorting section 2 receives the output (or the stored value) of the attribute register 5, thereby rearranging the data items stored in the database 1 based on the designated attribute.

At this point in time, the displayed data selection section 3 selects several rows starting from the display start row supplied from the display start row register 8 from the data set in which the data items have been sorted by the data sorting section 2. On the other hand, the data display device 4 displays the data items selected by the displayed data selection section 3 on the display screen 102a and performs a prominent display on only the row (or data item) designated by the selected row register 10 among the displayed data items.

Moreover, in the case where the user performs a manipulation for changing the displayed row, the selected row selector 11 calculates a value to be stored in the selected row register 10 (i.e., the row number of the data item to be prominently displayed) based on the output of the displayed row selection switch 12 and a value currently stored in the selected row register 10, and then stores the calculated value in the selected row register 10.

Furthermore, the display start row selector 9 calculates a value to be newly stored in the display start row register 8 based on the value newly stored in the selected row register 10, a value currently stored in the display start row register 8 and the output of the displayed row selection switch 12, and then stores the calculated value in the display start row register 8.

Next, specific search processing performed for searching a desired musical piece data item corresponding to one musical piece from a set consisting of a plurality of musical piece data items will be described with reference to FIGS. 2 to 5.

As described above, the database 1 includes musical piece data items corresponding to 1000 musical pieces. The data item display region 20 set on the display screen 102a of the display device 102 can display musical piece data items 20a corresponding to 20 musical pieces. It is noted that the initial display state of the data item display region 20 set on the display screen 102a is shown in FIG. 2.

In this state, the designated (or remarked) attribute column is "singer's name" and the output value of the attribute register 5 corresponds to "singer's name". The designated (or remarked) musical piece data item corresponds to a musical piece entitled "そのまま (Sonomama)" and sung by a singer "松任谷 由美 (Matsutoya Yumi)" and the output value of the selected row register 10 corresponds to No. 800. The musical piece data item displayed on the top row in the display region 20 corresponds to a musical piece entitled "燃える瞳を持ち続けて (Moeru-hitomi-o-mochitsuzukete)" sung by a singer "松阪晶子 (Matsuzaka Akiko)" and the output value of the display start row register 8 corresponds to No. 792.

That is to say, in the initial display state of the data item display region 20 shown in FIG. 2, all the musical piece data items are sorted in the order of the pronounced sounds of the Chinese characters representing the singers' family names (i.e., in the order of "あいうえお" or the Japanese kana characters). Therefore, the number 792 corresponding to the output value of the display start row register 8 and the number 800 corresponding to the output value of the selected row register 10 indicate the locations of the musical piece data items from the top musical piece data item when all the musical piece data items composing the musical piece data set in the database 1 are arranged in the order of the pronounced sounds of the Chinese characters representing the singers' family names.

In this display state, when the user performs a key manipulation for selecting a row one row lower than the currently remarked row, a signal corresponding to this manipulation is output from the displayed row selection switch 12 to the selected row selector 11. The selected row selector 11 calculates a new value "801" to be stored in the selected row register 10 based on this signal and the current output value "800" of the selected row register 10 and then outputs the new value to the selected row register 10. Then, the new value "801" is stored in the selected row register 10.

At this time, the display start row selector 9 calculates a new value "792" to be stored in the display start row register 8 based on the value "801" newly stored in the selected row register 10 and the value currently stored in the display start row register 8 and then outputs the new value to the display start row register 8. Then, the new value "792" is stored in the display start row register 8.

As a result, the display state in the data item display region 20 is changed into the state shown in FIG. 3. When the user performs a key manipulation for changing the attribute in such a state, a signal corresponding to this manipulation is output from the attribute selection switch 7 to the attribute selector 6. The attribute selector 6 calculates a new value "lyrics" to be stored in the attribute register 5 based on this signal and the current output value "singer's name" of the attribute register 5 and then outputs the new value to the attribute register 5. Then, the new value "lyrics" is stored in the attribute register 5.

Therefore, a signal designating "lyrics" as an attribute is supplied to the data sorting section 2, so that all of the musical piece data items in the database 1 are sorted again based on the lyrics. At this time, the value "801" currently stored in the selected row register 10 is considered by the data sorting section 2. As a result, the data items are sorted such that the location of the data item currently displayed remarkably on the display screen 102a of the display device 102 does not change. Consequently, the display state of the data item display region 20 is changed into the state shown in FIG. 4.

When the user further performs a key manipulation for selecting a displayed row six rows higher than the currently remarked row in this display state, the selected row selector 11 calculates a new value "795" to be stored in the selected row register 10 based on a signal supplied from the displayed row selection switch 12 and the current output value "801" of the selected row register 10 and then outputs the new value to the selected row register 10. Then, the new value "795" is stored in the selected row register 10. If the users further performs a manipulation for changing the attribute in this state, the attribute selector 6 calculates a new value "singer's name" to be stored in the attribute register 5 based on a signal supplied from the attribute selection switch 7 and the current output value "lyrics" of the attribute register 5 and then outputs the new value to the attribute register 5. Then, the new value "singer's name" is stored in the attribute register 5 and then output to the data sorting section 2. As a result, all of the musical piece data items in the database 1 are sorted again by the data sorting section 2 based on the attribute value "singer's name", so that the displayed contents of the data item display region 20 are changed into those shown in FIG. 5.

Next, a specific method for sorting the attribute values such as "singer's names" based on the pronounced sounds of the Chinese characters thereof will be briefly described.

Figure 6:
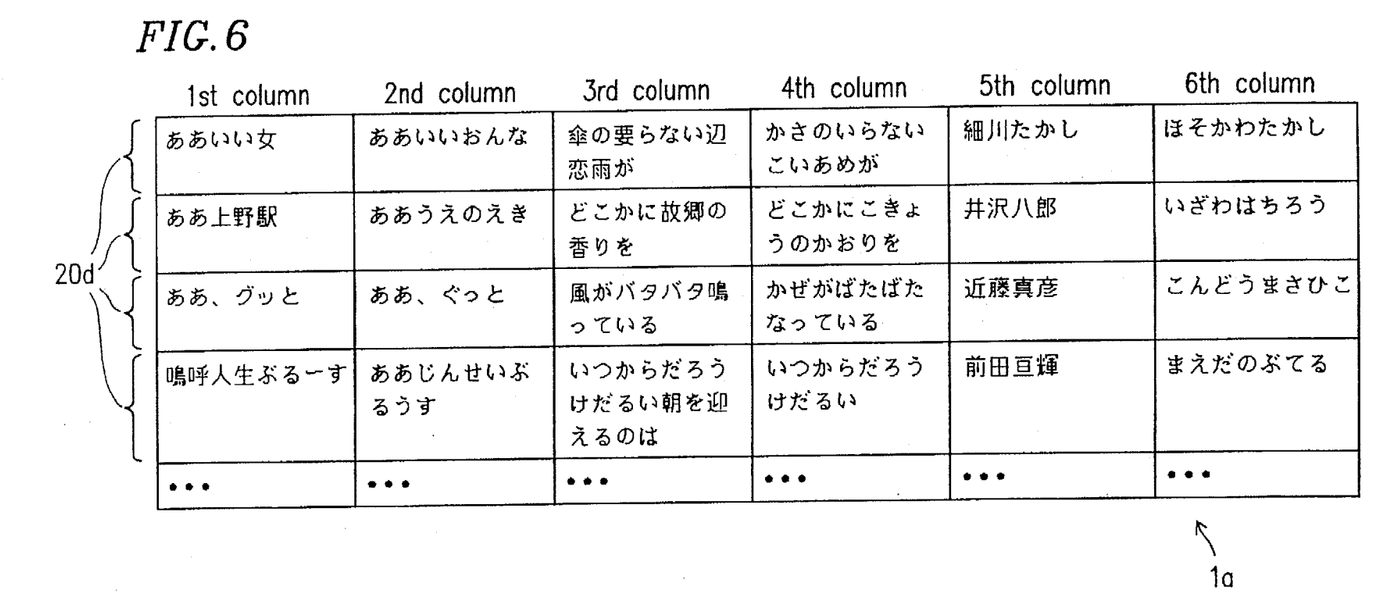
FIG. 6 is a table for illustrating an exemplary arrangement of a database and an exemplary data sorting method in the data search apparatus.

FIG. 6 is a table showing how a plurality of musical piece data items are stored in the database 1 of FIG. 1. In FIG. 6, a data arrangement 1a about the attribute values of each of the musical piece data items 20d is illustrated as a two-dimensional row. The names of tunes are located in the first column of the data arrangement 1a; the pronounced sounds of the names of tunes are located in the second column thereof; the lyrics of the tunes are located in the third column thereof; the pronounced sounds of the lyrics are located in the fourth column thereof; the names of the singers singing the tunes are located in the fifth column thereof; and the pronounced sounds of the singers' names are located in the sixth column thereof. In the state shown in FIG. 6, the designated attribute is "name of tune" and the musical piece data items are sorted based on the pronounced sounds of the names of tunes.

In the case where this database 1 is used, the musical piece data items 20 can be sorted in the order of "あいうえお" based on the pronounced sounds of the "singers' names", one of the attributes, in the following procedure, for example.

First, the data "ほそかわたかし (Hosokawa Takashi)" located on the first row in the sixth column of the data arrangement 1a is compared with the data "いざわはちろう (Izawa Hachiro)" located on the second row in the sixth column. Since "ほそかわたかし" is subsequent to "いざわはちろう" in accordance with the arrangement order adopted in a commonly used Japanese dictionary (because the top kana character "ほ (Ho)" is subsequent to the top kana character "い (I)" in the Japanese kana syllabary), all the data located on the first row is interchanged with all the data located on the second row.

Next, the data "ほそかわたかし (Hosokawa Takashi)" located on the second row in the sixth column of the interchanged data arrangement is compared with the data "こんどうまさひこ (Kondo Masahiko)" on the third row in the sixth column. Since "ほそかわたかし" is subsequent to "こんどうまさひこ" (because the top kana character "ほ (Ho)" is subsequent to the top kana character "こ (Ko)" in the Japanese kana syllabary), all the data located on the second row is interchanged with all the data located on the third row. By repeating this processing until the last row, the first processing cycle is finished.

After the first processing cycle is finished, the data "いざわはちろう (Izawa Hachiro)" located on the first row in the sixth column of the data arrangement is compared with the data "こんどうまさひこ (Kondo Masahiko)" located on the second row in the sixth column at the point of time. Since "いざわはちろう" is prior to "こんどうまさひこ" (because the top kana character "い (I)" is prior to the top kana character "こ (Ko)" in the Japanese kana syllabary), these data are not interchanged. Next, the data "こんどうまさひこ" located on the second row in the sixth column is compared with the data "ほそかわたかし" on the third row in the sixth column. By repeating this processing until the last row, the second processing cycle is finished.

By repeating these processing cycles the same number of times as the number of rows included in the data arrangement, i.e., the number of musical piece data items stored in the database, all the musical piece data items are sorted based on the pronounced sounds of the "singers' names".

The data sorting method described above is the simplest method. By using other data sorting methods such as a "quick sort method" and a "heap sort method", all the data items can be sorted more quickly.

In this example, when the data sorting section 2 supplies all the data of the data arrangement except for the read data to the displayed data selection section 3, the data sorting section 2 also supplies only one acronym of the read data having an attribute value used for the sorting. As a result, displays including acronym columns 22a and 23a, respectively, can be obtained as shown in FIGS. 2 and 4.

In the case of utilizing only the above-described method, when the attribute used as a reference for the sorting is changed, the data item selected by the selected row selector 11 is changed from the data item before the sorting is performed, so that the contents of the row remarkably displayed on the display screen 102a of the data display device 4 are also changed. However, in this example, the remarked data item selected by the selected row selector 11 or the value of the selected row register 10 has been stored in the data sorting section 2 before the sorting of the data items is performed. By shifting the arrangement of all the data items with respect to the reference location such that the remarked data item remains at the same display location as the location thereof before the sorting is performed, the row currently remarkably displayed on the display screen 102a of the data display device 4 is not changed.

For example, in the case where the data included in the remarkably displayed row (or data item) located on the 200 th row from the top data item row before the sorting operation has been performed moves to the 100 th row counted from the top data item row after the sorting operation has been performed, all the data items after the sorting operation has been performed are shifted downward by 100 rows by using the location of the data item display region 20 corresponding to the location at which the top data item is displayed as a reference, whereby the data included on the row (data item) remarkably displayed before the sorting operation has been performed can be displayed at the same display location as the location before the sorting operation has been performed.

Herein, the present invention has been described while assuming that there are three attributes. However, the same operation can be performed with respect to an arbitrary number of attributes.

As is apparent from the foregoing description, the data search apparatus according to the present invention can effectively extract a desired data item from a set consisting of a plurality of data items, each of which has a plurality of attributes, by performing simple operations of changing the attribute of the data items displayed on the display screen and changing the remarkably displayed row.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data search apparatus which is provided with a body device for processing information, an input device for inputting the information to the body device and a display device for displaying the processed information on a display screen, thereby searching for a desired data item from a data set including a plurality of data items, comprising:

data storage means for holding and storing data about all of the plurality of data items in a state where each of the plurality of data items is represented as a row, on which a plurality of attribute values about the data item are arranged in line, and the rows corresponding to the plurality of data items are sorted in a predetermined order decided by a designated attribute;

display control means for selectively displaying a predetermined number of data items from the plurality of data items in the predetermined order decided by the designated attribute on the display screen of the display device such that the attribute values of each of the displayed data items are arranged in line and that a designated data item row and a designated attribute value column are displayed in a different state from the other data item rows and the other attribute value columns;

designation change means for changing the designated row and the designated attribute value column in accordance with an input from the input device for newly designating another row and another attribute value column to be displayed on the display screen; and data item sorting means for sorting all of the plurality of data items which are stored in the data storage means in a new order determined by the newly designated attribute when the attribute is changed, whereby the plurality of data items are sorted while maintaining a state where the designated data item row remains displayed on the display screen.

2. A data search apparatus according to claim 1, wherein the data item sorting means shifts an arrangement of all of the plurality of data items with respect to a reference location such that the designated data item is held at the same location on the display screen before and after the plurality of data items are sorted.

* * * * *